June 30, 1936.  G. H. MILES  2,046,202
OPTICAL PROJECTION APPARATUS
Filed Oct. 12, 1935    4 Sheets-Sheet 2
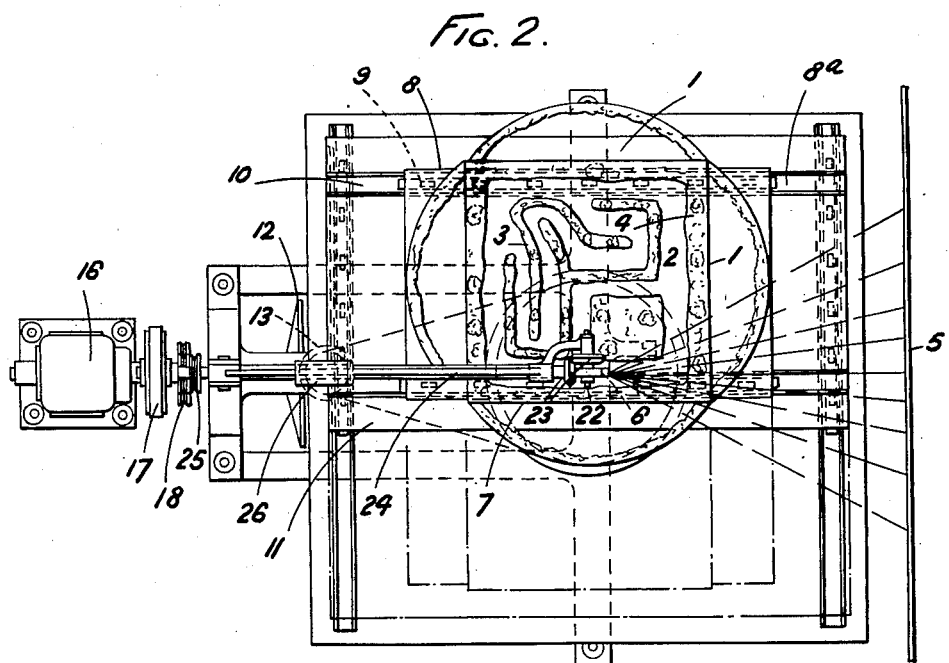
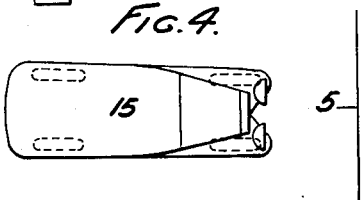
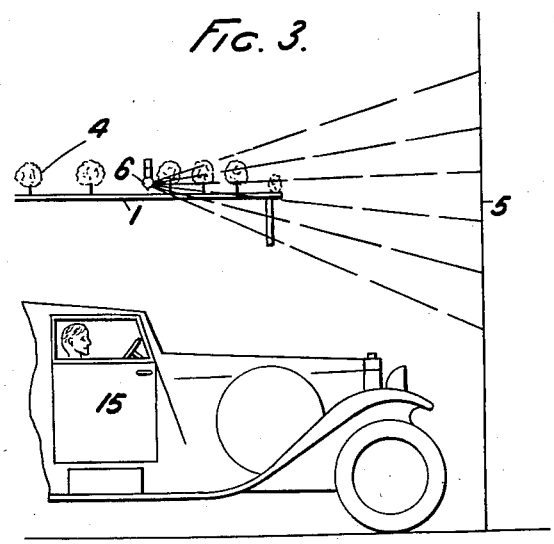
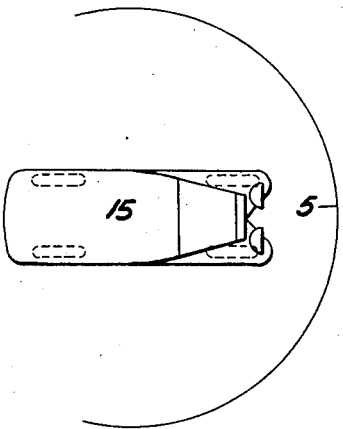
Inventor
George Herbert Miles
By Dowell & Dowell
Attorneys

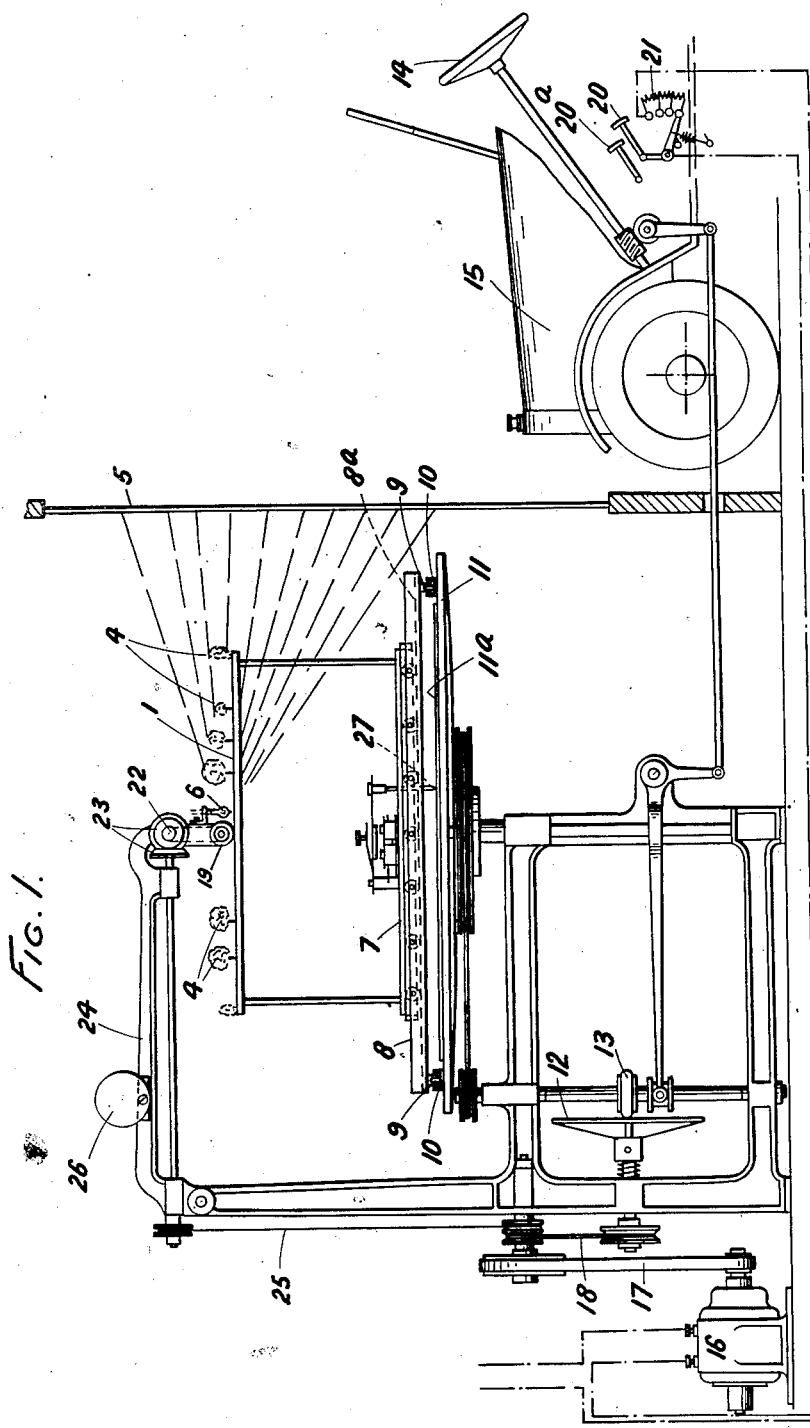

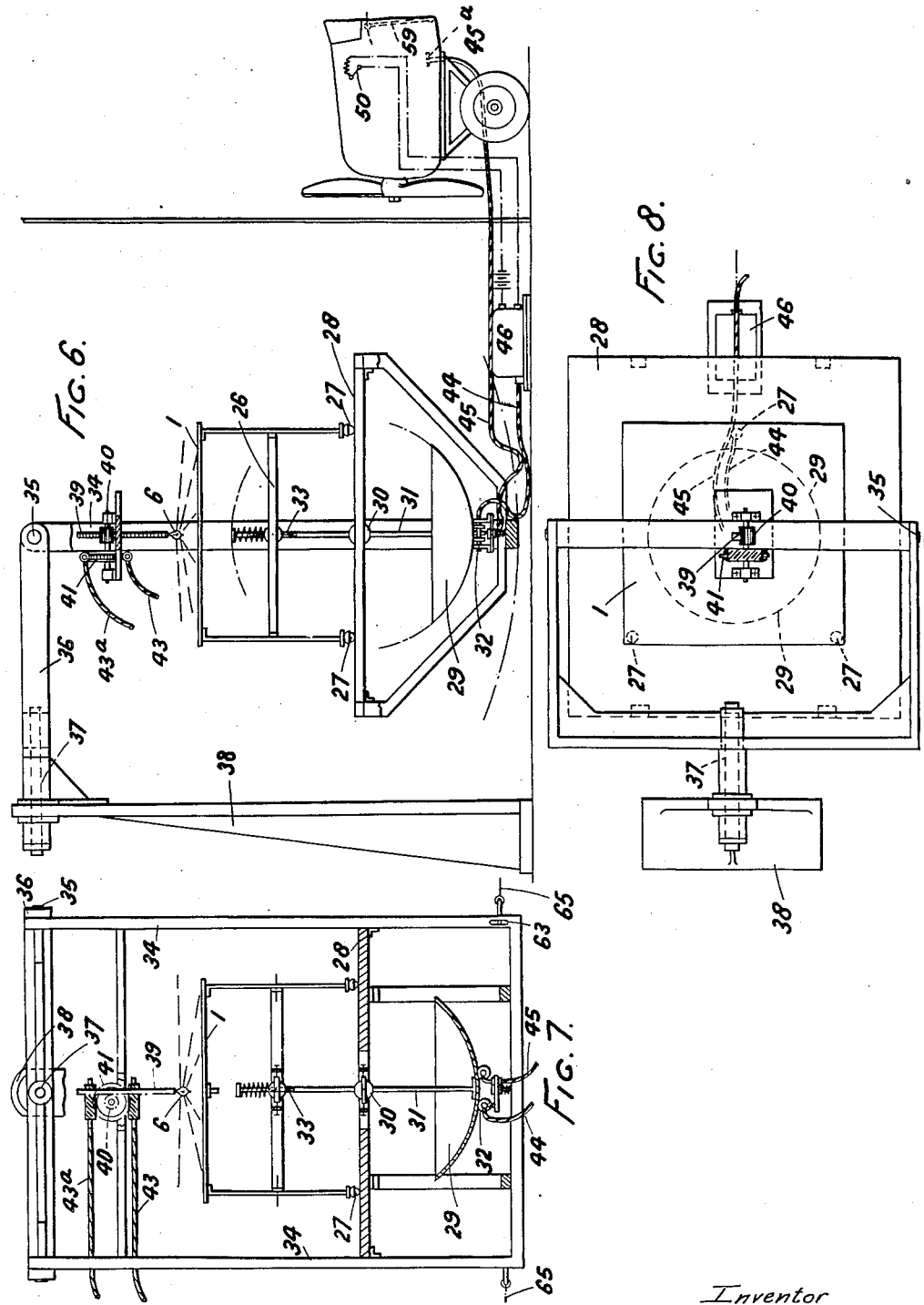

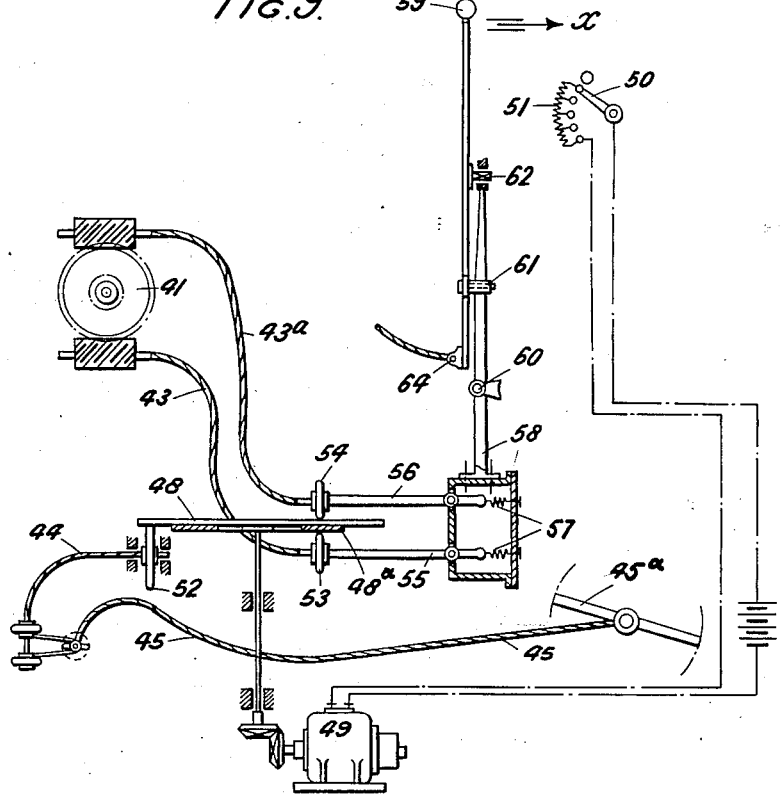
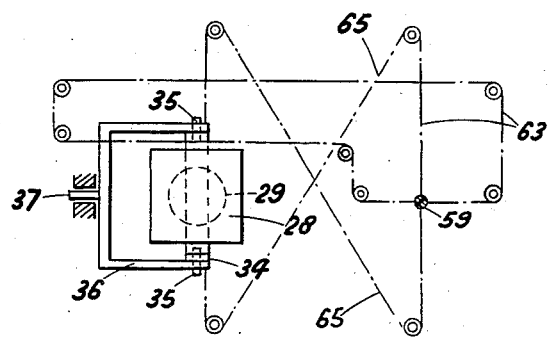

Patented June 30, 1936

2,046,202

UNITED STATES PATENT OFFICE 2,046,202

OPTICAL PROJECTION APPARATUS

George Herbert Miles, New Barnet, Herts, England

Application October 12, 1935, Serial No. 44,786
In Great Britain November 29, 1933

15 Claims. (Cl. 35—11)

This invention relates to illusion devices of that character wherein, or by which, a sense of movement is deceptively produced.

For educational test, amusement or training purposes, various means have been proposed for simulating and creating the impression of movement or travel of a person while he is really stationary, and, in some cases, affording the individual an opportunity of controlling his apparent movement or travel course which is pursued.

The object of the present invention is to provide such an illusion and control in a better way than has heretofore been possible. To this end it consists in projecting upon a screen an ever varying image of a model scene in relief, by light emanating from a laterally stationary position or positions relative to said screen corresponding approximately to the position occupied by the eye of an observer in relation to the screen upon which the projected image is being viewed, and placing at the disposal of the observer a means of enabling the speed at which the scene is moved relatively to the light source to be varied and, also, means operable by the observer whereby the relative positions of the same and the light source can be altered to secure the illusion of his movement in any desired plane.

The image may be projected upon a translucent screen or upon an opaque screen and the screen may be either flat or curved to produce a more or less panoramic view.

Broadly, the apparatus for carrying this method into effect comprises a carrier upon which the model scene is mounted in a manner free to enable it to be moved by suitable mechanism into any desired position relative to the source of light and to the screen onto which its shadow is projected. The carrier may be in the form of a turntable, and a frictional feed wheel arrangement, bearing upon the scene or the carrier upon which the scene is mounted, is employed therewith to produce movement of the scene in relation to the screen. The feed wheel arrangement can be operated at varying speeds and the turntable can be arrested or rotated in opposite directions, at varying speeds, the operations being effected through gearings independently controllable by the observer.

If desired, provision may also be made for recording the various directional control movements performed by the observer.

The actual apparatus employed may take various forms, as will be apparent from the following description of the invention with reference to the accompanying drawings, wherein:

Fig. 1 is a diagrammatic side elevation and Fig. 2 is a plan view of one arrangement;

Fig. 3 is a view somewhat similar to Fig. 1, illustrating a modification, and Figs. 4 and 5 are alternative plan views;

Figs. 6 and 7 are diagrammatic elevations of apparatus adapted to enable the art of flying to be simulated;

Fig. 8 is a plan view thereof, and;

Figs. 9 and 10 are illustrative diagrams which will be referred to more particularly hereinafter.

As shown in Figs. 1 and 2, in order to simulate the supposed performance of a motor driven along a route, the scene of the route, or a model landscape, may be built up upon a glass base or plate 1, the roadway 2 being clear but outlined by margins 3 of say green or other coloured translucent varnish, beyond or upon which are arranged objects 4 in relief representing hedgerows, fences, trees and so forth. This base plate 1 is arranged horizontally at a distance from a flat translucent screen 5, upon which an image of the roadway and of the several objects are projected by a source of illumination, which source is arranged to give, as nearly as possible, a point of light, such as light from a gas-filled electric bulb 6, containing a spiral filament disposed end-on to the screen, the lamp being arranged at a height above the roadway which, to scale, would represent practically the view point of a person travelling in a car on such roadway.

The landscape base 1 is mounted upon the uppermost carriage 7 of two superposed carriages 7 and 8, between which relative movement at right angles to one another can occur, the lowermost carriage 8 having wheels 9 running on rails 10 upon a turntable 11. This turntable is driven through infinitely variable friction gear 12, 13, under the control of the steering wheel 14 of a dummy car 15 at the viewing side of the screen 5. An electric motor 16 is shown driving the wheel 12 of the friction gear through belts 17, 18. The landscape base 1 is adapted to be moved backwards away from the screen upon rollers moving along rails 8ª incorporated in the lower carriage 8, irrespective of what the angular position of the turntable 11 may happen to be, by means of a rubber-tired wheel 19 bearing upon the base and located closely adjacent to the light source, this wheel 19 being driven advantageously by the aforesaid electric motor 16 under control of an accelerator pedal 20 on the dummy car 15. The speed of the motor 16 may in this way be varied, as through a variable rheostat 21, or it may remain constant and the speed variation be obtained by operation of an infinitely variable friction gear.

A pedal 20ª also provided on the car applies any suitable form of brake to the main drive.

The aforedescribed or "feed" wheel 19 is shown to be belt driven from the short spindle 22 of bevel gear 23, carried on the outer end of a pivoted arm 24, the drive being derived from the motor 16 through belt 25, and the pressure exerted by the wheel 19 upon the base 1 being determined by an adjustable weight 26.

To record the track taken, a plan of the landscape may be fastened to the turntable 11, as indicated at 11ª, and marked by a dotting pen 27 or other suitable device movable with an appropriate part of the apparatus, in this case the carriage 7.

From the foregoing it will be understood that other mechanical arrangements may be adopted to secure the results intended. For instance, by a simple modification of the arrangement the image might be thrown upon an opaque screen from the front, or observer's side as diagrammatically illustrated in Fig. 3. The screen itself may be flat as shown in the plan view of Fig. 4, or it may be curved as shown in Fig. 5. In fact, it may be of any other suitable shape. Further, instead of the double carriage described for permitting a universal movement of the landscape base horizontally, under the action of its associated feed wheel, the turntable might be replaced by a multipoint ball or wheel support.

Similarly, although a dummy car has been described as employed to produce the illusion of car driving, an actual car may of course be used, the same being jacked up and its controls being appropriately connected to the apparatus. In place of the glass base, some other transparent material may be used for the building of the image or model landscape, or a net of fine wire held in a frame might be used for the purpose.

The invention is capable of wide application, the landscape being replaced for example by a seascape for the illusion of boating to be secured.

Also, the illusion of flying may be obtained by employing a joy-stick and gear to alter the position of a land or seascape vertically, in relation to the light source, as when taking off or landing.

Figs. 6, 7 and 8 illustrate one practicable arrangement suitable for producing the illusion of flying, and Figs. 9 and 10 are associated diagrams.

In this latter arrangement, the scene base 1 is carried by a platform 26 equipped with three universal runners 27 working on a track plate 28. A member 29, in the form of a portion of a sphere, and struck from the centre of a gimbal 30 is attached to a rod 31 capable of universal movement under the control of an inverted tricar 32 bearing on its external surface, the rod 31 having a squared portion passing through a sleeve 33 of square cross section universally suspended at the centre of the platform, so that the latter responds to both lateral and rotary movement of the member 29.

All the parts, including the light source 6, are mounted in a frame 34 that is pivotally suspended at 35 from a fork 36, which can oscillate about a horizontal pivot 37 carried by a stationary standard 38.

The light source 6 is capable of being raised and lowered by means of a rack 39, a pinion 40 in engagement therewith being operable by a worm wheel 41 and either of two worms 42 independently rotatable by flexible shafts 43, 43ª. Two of the wheels of the tricar 32 are driven by a flexible shaft 44 and the third wheel, which is a castor, is controlled by a flexible shaft 45. The flexible shafts 43, 43ª, 44 lead from a gear box 46 and the flexible shaft 45 leads from the axis of a rocking cross bar 45ª in the body of a dummy aeroplane 47, the bar 45ª corresponding to that usually employed to operate the rudder (Figs. 6 and 9).

The gear box 46 (see Fig. 9) comprises a friction wheel 48 driven by a motor 49 at varying speeds under the control of a starting switch 50 and rheostat 51. The shaft 44 of the tricar driving wheel is connected to a wheel 52 in constant engagement with said wheel 48. On the underside of the wheel 48 is an annulus 48ª, somewhat of the section shown, with which a pinion 53 is adapted to be temporarily engaged. With the upper surface of the wheel 48 a pinion 54 is adapted to be temporarily engaged. The pinions 53, 54 are carried by spindles 55, 56 which are yieldingly held by springs 57 in a frame 58 so that the pinions are out of engagement when a joy stick 59 is in neutral position. The frame 58 is pivoted at 60 so that it can be rocked to and fro and the joy stick 59 is pivoted at 61 to the frame 58 so that it can be rocked from side to side in relation to the frame, which latter is formed at 62 with a slotted way to allow of this movement.

The arrangement thus far described operates as follows: With the parts as in Fig. 9, that is to say, with the joy stick in neutral position, closure of the switch 50 results merely in the tricar being driven and the scene 1 is moved as in taxi-ing, the apparent direction of travel being governed by pedal operation of the rudder rocking bar 45ª. The speed is controlled by use of the rheostat 51. Thus far, the position of the light source 6 is unaffected. However, if now it is assumed that a climb is to be initiated, then the joy stick is moved in the direction of the arrow $x$, with the result that the frame 58 is so turned about its pivot 60 as to engage the pinion 53 with the annulus 48ª of wheel 48. The light source 6 is accordingly raised through rotation of the shaft 43 and its associated gear 42, while the gear associated with the shaft 43ª causes its pinion 54 to merely free wheel. When the desired height is attained the joy stick is further moved in the same direction and the pinion 53 is advanced out of engagement with the annulus 48. When descending, the joy stick is moved forward, that is to say, in a direction opposite to that of the arrow $x$, and the pinion 54 then engages the wheel 48, the yielding connection allowing it to be gradually advanced towards the periphery so that the light source 6 will be gradually lowered at an increasing speed. This effect of a falling and rising horizon, achieved by raising and lowering the light source, is increased by tilting the frame 34 about its axis 35, which is accomplished by means such as the cord and pulley system 63 (see Fig. 10) attached to the joy stick 59 at 64. The effect of banking, due to moving the joy stick to one side or the other, is obtained by a cord and pulley system 65 (Fig. 10) which rocks the frame 34 about its pivot 37.

For amusement or instructional purposes the apparatus may be associated with any suitable coin or token fee or prepayment means, including apparatus for recording the number of persons making use of the equipment.

What I claim is:—

1. A method of creating in the mind of a person the impression of his own movement or travel in a vehicle while he himself is really stationary and enabling the person to control the apparent movement or course pursued, characterized by projecting in relief upon a screen confronting the person the image of a model scene by a source of light directing rays from a laterally stationary position relative to the said scene corresponding approximately to the position occupied by the eye of the person in relation to the screen upon which the projected image is viewed from a fixed position, rendering the image scene changeable and ever varying by moving the model scene in relation to the light source by and according to the person's manipulation of the controls of the vehicle in which he is supposedly riding the same as if he were actually operating a true vehicle over the real or the model scene, and rendering the speed of the scene change and variation variable according to the person's manipulation of the throttle control of the supposed vehicle from his fixed position.

2. A method of creating in the mind of a person the impression of his own movement or travel in a vehicle while he himself is really stationary, which consists in seating the person in a dummy vehicle confronting a screen, projecting onto the screen in relief the image of a model scene by a source of light positioned relative to said scene corresponding approximately to the position occupied by the eye of the person in relation to the screen upon which the projected image is viewed, and rendering the image on the screen changeable and ever varying by movement of said model scene in relation to the light source by and according to the person's manipulation of the dummy vehicle controls the same as if he were operating a true vehicle over the same scene in reality.

3. A method of creating in the mind of a person the impression of his own movement or travel in a vehicle along a course while he himself is actually stationary, which consists in seating the person in a dummy vehicle having controls corresponding to the true vehicle in which he confronts a screen, projecting onto the screen in relief the image of a model scene by a source of light positioned relative to said model scene corresponding approximately to the position occupied by the eye of the person in relation to the screen upon which the projected image is viewed, rendering the image on the screen changeable and ever varying by movement of said model scene in relation to the light source by and according to the person's manipulation of the dummy vehicle controls the same as if he were operating a true vehicle from the position of the light source over the same scene of the model image in reality, and rendering the speed of the scene change and variation variable according to the person's manipulation of the throttle control of the dummy vehicle.

4. A method of creating in the mind of a person the impression of his own movement or travel in a vehicle over a landscape area while he himself is really stationary, which consists in seating the person in a dummy of the vehicle confronting a screen and having controls corresponding to those of a true vehicle of the kind, projecting in relief upon the screen the image of a model scene by a source of light in a position relative to said model scene corresponding approximately to the position occupied by the eye of the person in relation to the screen upon which the projected image is viewed, and rendering the image scene changeable and ever varying by movement of the model scene in relation to the light source by and according to the person's manipulation of the dummy vehicle controls as he might or would manipulate the controls of the true vehicle if moving over the same landscape area of the model scene in reality from a position corresponding to that of the light thereto, so as to secure the illusion of movement thereover in any desired plane depending upon the manner of manipulating said controls.

5. An apparatus for creating in the mind of a person the impression of his own travel while he himself is really stationary, comprising a stationary screen, a stationary support for a person in position at which to view the screen, a translucent scene base, a model scene in relief mounted on said base, a carrier for said base, a source of light mounted on the carrier and emitting rays at a height above the base so as to project onto said screen an image resulting from the base and model, the position of said light source being laterally stationary relative to the aforesaid carrier, and the base being movable in all directions within its own plane relative to the light source, means associated with said carrier and having control connection located at said support operable by an observer there for moving the base so as to produce a changing and ever-varying scene image on the screen, and means also associated with said carrier and likewise having control connection located at said support operable by the observer there for controlling the image variation according to choice.

6. An apparatus according to claim 5 wherein the means for controlling the image variation is adapted also to vary the speed of such image variation.

7. An apparatus according to claim 5 wherein the carrier for the scene base and light source is stationary and said base is capable of movement in any direction by mounting upon a turn-table mounted on the carrier.

8. An apparatus according to claim 5 wherein the carrier for the scene base and light source in movable and embodies a universally mounted track-way so as to be capable thereby of being tilted in any direction, the scene base being capable of independent movement in any direction upon said track-way.

9. An apparatus for creating in the mind of a person the impression of his own movement or travel in a vehicle over a landscape area or scene while he himself is really stationary, comprising, in combination, a dummy vehicle having controls corresponding to those of the true vehicle in which the person is seated, a stationary screen confronting the position of the dummy vehicle, a model scene or landscape area formed in relief upon a translucent base, a carrier mounting for said scene base remote from the screen, a source of light mounted on the carrier and directing rays at a height above the scene base so as to project in relief upon said screen an image resulting from the base and scene, said light source being fixed in a relation to the scene area at a position corresponding approximately to the position occupied by the eye of the person in relation to the screen upon which the projected image is viewed and said base being movable in all directions relative to the light source, and means connected with the controls of the dummy vehicle for thereby moving the scene base in relation to said light source as if the light source itself were moving over said base so as to produce a changing and ever varying scene image on the screen according to the control manipulation as if the person were moving over the same scene or landscape in reality.

10. An apparatus for creating in the mind of a person the impression of his own movement or travel in a vehicle over a landscape area or scene while he himself is really stationary, comprising, in combination, a dummy vehicle having controls corresponding to those of the true vehicle in which the person is seated, a stationary screen confronting the position of the dummy vehicle, a model scene or landscape area formed in relief upon a translucent base, a carrier mounting for said scene base remote from the screen, a source of light mounted on the carrier and directing rays at a height above the scene base so as to project an image resulting from the same onto said screen in relief, said light source being fixed in a relation to the scene area at a position corresponding approximately to the position occupied by the eye of the person in relation to the screen upon which the projected image is viewed and said base being movable in all directions relative to the light source, and means connected with the controls of the dummy vehicle for thereby moving the scene base in relation to said light source as if the light source itself were moving over said base so as to produce a changing and ever varying scene image on the screen according to the control manipulation the same as if the person were operating the vehicle over the same scene or landscape in reality, said means including means of controlling the speed variation of the scene change and variation according to the accelerator manipulation of the vehicle control.

11. An apparatus for creating in the mind of a person the impression of his own movement or travel over a landscape area while he himself is actually stationary, comprising, in combination, a dummy vehicle having controls operable the same as those in a true vehicle of the kind, a screen confronting the person seated in the dummy vehicle, a model landscape area mounted for scene projection onto the screen, a light for projecting a scene image of said area onto the screen in relief, and means for changing and constantly varying the scene of the image according to the positioning of the light in relation to said area, together with means for changing the relation of the light to said area in any plane at will, said means being controllable by manipulation of the controls in the dummy vehicle by the person seated therein.

12. An apparatus for creating in the mind of a person the impression of his own movement or travel over a landscape area while he himself is actually stationary, comprising, in combination, a dummy vehicle having controls operable the same as those in a true vehicle of the kind, a screen confronting the person seated in the dummy vehicle, a model landscape area mounted for scene projection onto the screen, a light for projecting a scene image of said area onto the screen in relief the same as if the observer were viewing the same scene in reality from a point corresponding to the position of the light, and means for moving said area in relation to the light in any plane the same as if the light were moving over the area so as to change and constantly vary the scene of the image according to the positioning of the light in relation to said area, said means being connected with the controls of the dummy vehicle so as to be operable by manipulation thereof the same as if the person were operating a true vehicle over the same scene of the image in reality.

13. An apparatus for creating in the mind of a person the impression of his own movement or travel over a landscape area while he himself is actually stationary, comprising, in combination, a dummy vehicle having controls operable the same as those in a true vehicle of the kind, a screen confronting the person seated in the dummy vehicle, a model landscape area mounted for scene projection onto the screen, a light for projecting a scene image of said area onto the screen in relief, and means for changing and constantly varying the scene of the image the same as if the observer were moving over the same area in reality, the light being disposed in relation to said area correspondingly to the position of the eye over the real of the model landscape so as to project a like scene view onto the screen and the landscape area being movable with relation to the light as if the light itself were moving thereover, said means being connected with the controls of the dummy vehicle so as to be operable and controllable at will by the person's manipulation thereof the same as if he were manipulating a true vehicle over the real of the model area and thereby securing the illusion of actual movement along a self selected course.

14. An apparatus for creating the impression of a person's travel over a landscape area while he himself is really stationary, comprising, in combination, a dummy vehicle having steering accelerator and brake controls operable the same as those in a true vehicle of the kind, a screen confronting the person seated in the dummy vehicle, a model landscape formed on a translucent base adapted to scenic projection in relief upon the screen, a light for projecting a scene image of said area in relief upon the screen, means mounting the landscape area for rotational and slide movements in perpendicularly different directions in relation to the light and screen, said means being connected for operation with the steering control of the dummy vehicle and including a motor and variable friction gear for driving the rotational part thereof, means associated with the light affording traction upon the landscape area so as to move the same in relation to the light as if the light itself were moving over said area, said last named means being driven by said motor and operatively connected with the accelerator control of the dummy vehicle, and means connected with the brake control of the vehicle for controlling and stopping the driving motor.

15. An apparatus for creating the impression of a person's travel in an airplane over a landscape area while he himself is really stationary, comprising, in combination, a dummy airplane having steering rudder, lateral and elevational plane surface and accelerator controls operable the same as those in a real airplane, a screen confronting the person seated in the dummy airplane, a model landscape formed on a translucent base adapted to scenic projection in relief upon the screen, a light for projecting a scene image of said area in relief upon the screen, means mounting the landscape area for universal movement in relation to said light and means for moving said light in elevational relation to said area, said universal mounting including means for rotating the area in a horizontal plane operable by the steering rudder of the dummy airplane and means for tilting said area in any direction from the vertical operable by movement of the lateral surface control of the airplane, and said means for moving the light in elevation relative to said area being operable in opposite directions by movement of the elevational surface control of the airplane, together with means including a motor controllable through the accelerator control of the dummy airplane for functioning the several aforesaid movement means and imparting a normal rotational movement to the landscape area.

GEORGE HERBERT MILES.